United States Patent Office 2,919,177
Patented Dec. 29, 1959

2,919,177
PRODUCTION OF BORON TRIFLUORIDE DIHYDRATE

Francis F. Koblitz, Fitchburg, Wis., assignor to Callery Chemical Company, Pittsburgh, Pa., a corporation of Pennsylvania No Drawing. Application June 28, 1955
Serial No. 518,654

6 Claims. (Cl. 23—205)

This invention relates to the production of boron trifluoride hydrates.

Boron trifluoride ($BF_3$) is useful for various purposes. For instance, it is a valuable catalyst in a variety of reactions examples of which are alkylation, isomerization and polymerization. It is used also to produce diborane ($B_2H_6$) and other boron hydrides by reaction with, for instance, sodium borohydride ($NaBH_4$) or sodium hydride ($NaH$). For such and other purposes this reagent is commonly used in the form of a complex, or co-ordination compound, with ethers or alcohols, for ease of handling and metering as compared with its use in the simple gaseous state.

The production of boron trifluoride according to the classical and commercial methods is disadvantageous and objectionable from various standpoints such, for example, as relatively low yields based on the starting materials, the necessity for special techniques, and the requirements of special equipment and of unusual precautions necessitated by the highly reactive and toxic character of boron trifluoride. It is, accordingly, desired to have simpler and safer methods of producing boron trifluoride in a form in which it is more easily prepared and handled.

It is among the objects of this invention to provide a method of making boron trifluoride in the form of non-gaseous hydrated complexes that are useful for various purposes to which the fluoride is put that is simple, easily and safely practiced with readily available reagents.

Another object is to provide $BF_3:2H_2O$ by a simple and effective procedure.

Other objects will appear from the following specification.

Trimethyl borate [$B(OCH_3)_3$] is a compound that may be produced readily and easily from methanol ($CH_3OH$) and boric acid ($H_3BO_3$), boric oxide ($B_2O_3$), or borax ($Na_2B_4O_7$). A copending application filed by W. H. Schechter, Serial No. 509,389, filed May 18, 1955, discloses that trimethyl borate reacts readily with hydrogen fluoride (HF) to produce the complex $$BF_3:2CH_3OH$$

in accordance with the reaction:

$$3HF + B(OCH_3)_3 \rightarrow BF_3:2CH_3OH + CH_3OH$$

Boron fluoride di-methanol complex is a strongly acidic liquid boiling at 58° to 59° at 4 mm. Related complexes may be formed from other lower alkyl borates, e.g., the ethyl, propyl and butyl borates.

The conversion of boron fluoride di-methanol complex to boron trifluoride dihydrate in accordance with the invention is exemplified by the following test. A solution of 26.4 gm. (0.20 mol) of $BF_3:2CH_3OH$ in 50 gm. of methanol was stirred and cooled to minus 78° C. A solution of 11.4 gm. (0.63 mol) of water in 25 gm. of methanol was added at minus 78° C. The reaction mixture was stored at 28° C. for 16 hours after which it was vacuum distilled to remove the methanol and excess water with production of a crude product boiling at 43° to 44° at 2 mm. pressure. This was stirred with another 20 gm. (1.1 mols) of water for 15 minutes, then purified by distilling twice, resulting in a 97 percent yield of boron trifluoride dihydrate ($BF_3:2H_2O$), B.P. 54° (4 mm.) that formed a ternary complex with dioxane, $BF_3:2H_2O:C_4H_8O_2$, melting at 141° to 142°, the melting point reported for the dioxane derivative of boron trifluoride dihydrate (Meerwein and Pannwitz, 141 J. prakt. Chem. 123 (1934)).

By using less water than in the foregoing example it is possible to produce an intermediate hydrate, $$BF_3:CH_3OH:H_2O$$

Thus, 13.2 gm. (0.1 mol) of $BF_3:2CH_3OH$ were added to 25 gm. of $CH_3OH$ at 0° C., when 1.8 gm. (0.1 mol) of water were added. The mixture was stirred during 15 minutes and then distilled with recovery of 10.6 gm. of the ternary complex $BF_3:CH_3OH:H_2O$, B.P. 57° C. at 5 mm. Hg, a 90 percent yield. The dioxane derivative of the product melted at 140°–141° C.

The reaction conditions are not critical. Other lower alkyl borate-$BF_3$ complexes, for instance the lower alkyl borates, e.g., the ethyl, propyl and butyl borates, may be treated as just described or by other procedures that will occur to those skilled in the art.

These hydrates of boron trifluoride react with magnesium and iron with the evolution of hydrogen. Likewise, they may be used to produce boron trifluoride by reaction with alkaline earth salts, such as the halides, and pyrolysis of the resultant complexes. Thus, a suspension of 35.1 gm. of barium fluoride ($BaF_2$) in 30 gm. of n-butanol was stirred and cooled while 20.8 gm. of $BF_3:2H_2O$ was added. The mixture was stirred at 25° C. for 1.5 hours, then it was gradually heated to 70° C. and evacuated to 4 mm. to remove the solvent and any liquid products. The solid product weighed 47.8 gm. and was $BF_3:BaF_2$ containing about 4 gm. of tightly bound boron trifluoride dihydrate. A 3.0 gm. sample of this salt on pyrolysis gave 0.62 gm. of gaseous $BF_3$, a yield of 73 percent. Boron fluoride dihydrate likewise forms a complex with calcium salts, such as calcium chloride ($CaCl_2$), that may be pyrolyzed to produce $BF_3$ although in lower yield than when a barium complex is produced.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. That method of making a hydrate of boron trifluoride comprising reacting a lower alkyl alcohol-boron trifluoride complex with water, separating the hydrate formed from released alcohol, and recovering a complex containing $BF_3$ and $H_2O$.

2. A method according to claim 1, said first complex being $BF_3:2CH_3OH$.

3. That method comprising treating a lower alkyl alcohol-boron trifluoride complex with water to displace alcohol and form boron trifluoride dihydrate, and separating and recovering said dihydrate.

4. A method according to claim 3, said complex being $BF_3:2CH_3OH$.

5. A method according to claim 1, said lower alkyl alcohol-boron trifluoride complex and water being used in a mole per mole ratio to produce a ternary complex of $BF_3$, the alcohol of said lower alkyl alcohol-boron trifluoride complex, and water.

6. A method according to claim 5, the lower alkyl alcohol-boron trifluoride complex being $BF_3:2CH_3OH$, and the hydrate produced being $BF_3:CH_3OH:H_2O$.

References Cited in the file of this patent

UNITED STATES PATENTS

| | | |
|---|---|---|
| 2,135,458 | Schultz | Nov. 1, 1938 |
| 2,284,554 | Beyerstedt | May 26, 1942 |

FOREIGN PATENTS

| | | |
|---|---|---|
| 486,877 | Great Britain | June 10, 1938 |

OTHER REFERENCES

Booth: "Boron Trifluoride and Its Derivatives," pp. 53–55, 83 (1949), John Wiley & Sons, N.Y.C.

Gmelin's Handbuch der Anorganischen Chemie System No. 13, Boron, pp. 180–182 (1954), Verlog Chemie, GMBH, Wienheim/Bergstrasse.